Figure 1:
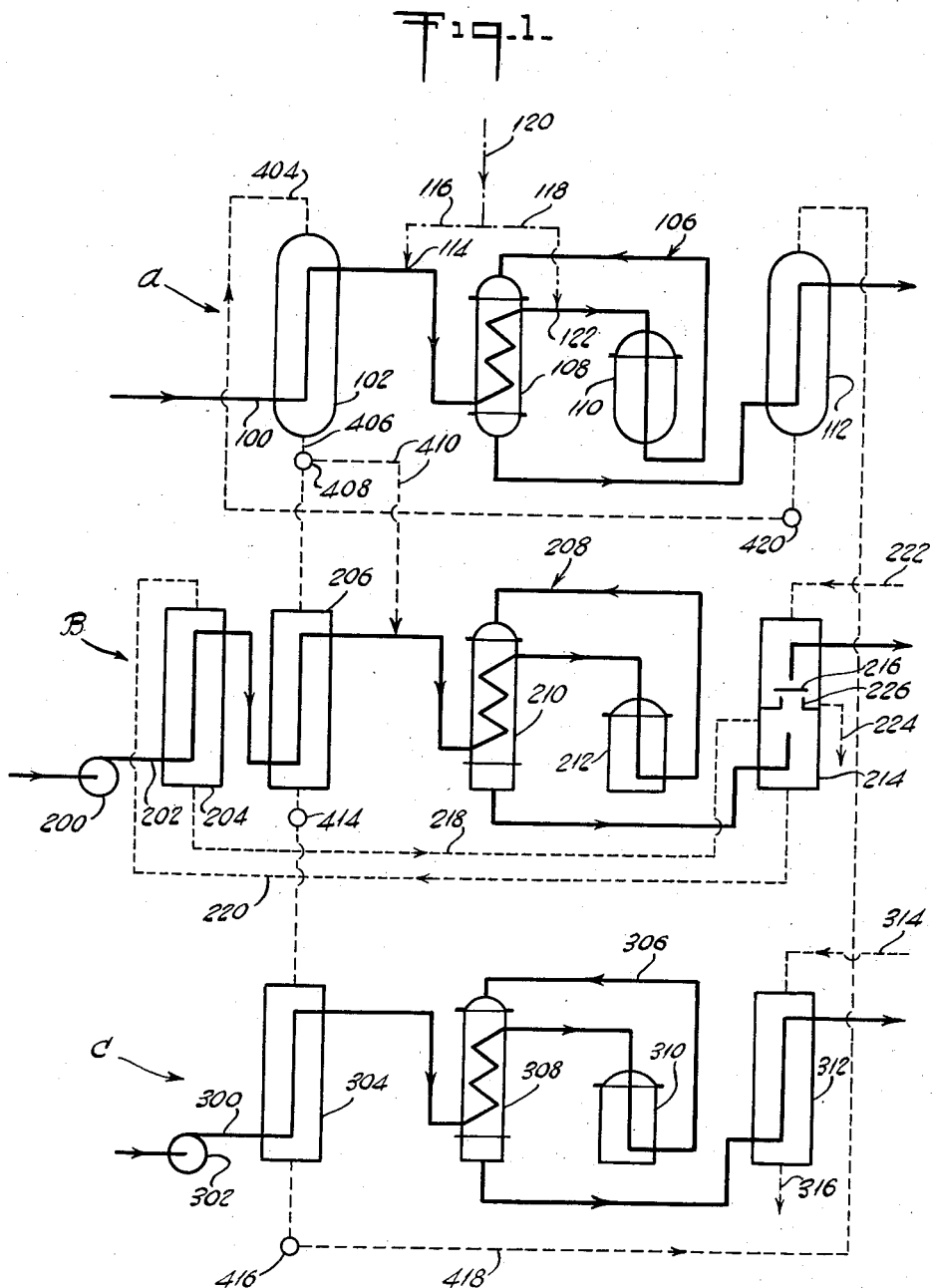

INVENTOR
FRIEDRICH BAUMANN
BY

ATTORNEY

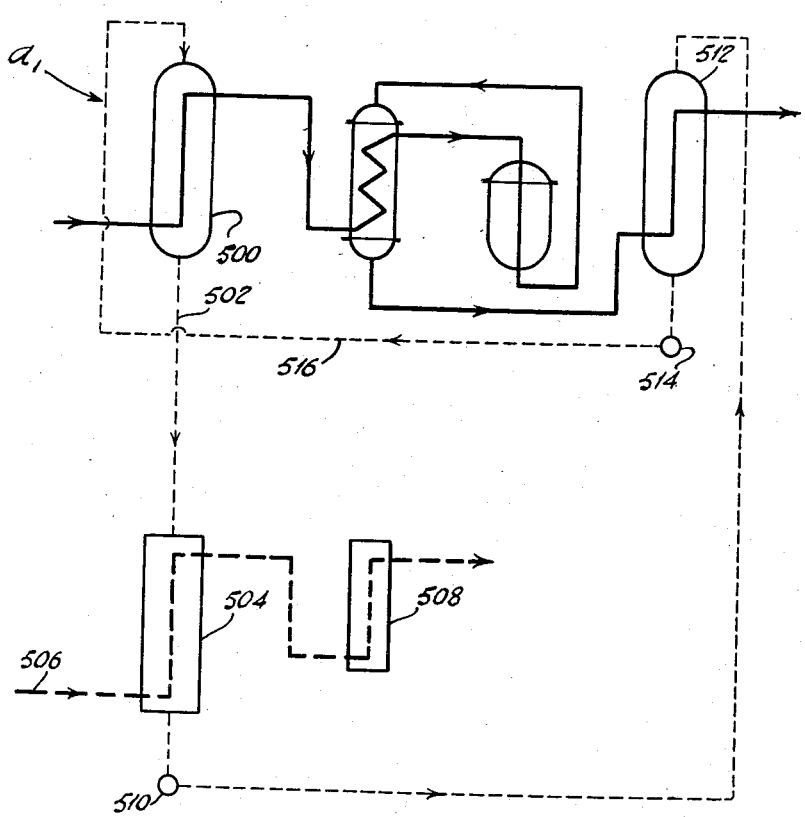

United States Patent Office

2,870,096
Patented Jan. 20, 1959

2,870,096

PROCESS OF CONVERTING CARBON MONOXIDE INTO A MIXTURE OF CARBON DIOXIDE AND HYDROGEN

Friedrich Baumann, Leuna, Kreis Merseburg, Germany

Application May 17, 1955, Serial No. 509,074

3 Claims. (Cl. 252—373)

The present invention relates to a process and a plant for converting carbon monoxide into a mixture of carbon dioxide and hydrogen, and more particularly to a process and a plant for converting carbon monoxide by reaction with water and/or steam.

It is an object of the present invention to make an efficient use of the heat stored in the water and/or steam.

It is a further object of the present invention to increase the efficiency of a process and/or plant described hereinabove to a much higher percentage than that obtained hitherto.

It is still another object of the present invention to increase the efficiency of the process and/or plant so as to avoid any heat losses in the steam used for the process and/or plant.

It is a still further object of the present invention to provide a process and/or plant of the kind described hereinabove which has practically a 100% efficiency as to the heat stored in the water and/or steam.

Other objects and advantages of the present invention will become apparent from the following detailed description thereof in connection with the accompanying drawings showing, by way of example, two embodiments of a plant according to the invention. In the drawings Fig. 1 is a flow sheet or diagram of a first embodiment of the present invention, and Fig. 2 is a diagram of another embodiment of the present invention.

Referring now to the drawings and first to Fig. 1, the plant comprises three systems A, B, and C. The system A is a high pressure converting device through which the crude gas is conducted along the path indicated by the reference numeral 100. The crude gas enters at a rate of approximately 100,000 cubic meters per hour and is first guided through a saturator or humidifier 102 which it traverses from the bottom to the top. In the saturator 102 the crude gas comes into intimate contact with hot water circulating along a closed path indicated by the dotted line 404 and which will be described more in detail hereinafter.

After passing the saturator 102 the crude gas passes a contact or oxidizing device generally denoted by 106 and including a heat exchanger 108 and a catalytic contact furnace 110 which are connected in series. From the heat exchanger 108 the gas is conducted to moisture condensing means such as a cooler or dehumidifier 112 which it enters from below and leaves at the top.

At a point 114 situated between the saturator 102 and the heat exchanger 108 a conduit 116 forming part of a forked conduit 120 shown in dash-dotted lines communicates with the path 100 of the crude gas, the other arm 118 of which communicates with the flow 100 of the gas at a point 122 situated between the heat exchanger 108 and the contact furnace 110. The object of this forked conduit will be explained hereinafter.

The system B is a converting device operating at a reduced pressure lower than that of the system A or even at atmospheric pressure. The converting device B comprises a fan 200 which conveys a crude gas at a rate of approximately 50,000 cubic meters per hour along a path indicated by the reference numeral 202. The gas flows first through a humidifier or wetting device 204 from the bottom to the top. Then the flow 202 of gas enters a further humidifier or wetting device 206. From here it is guided through a contact or oxidizing device generally denoted by 208 and including a heat exchanger 210 and a contact furnace 212 connected in series with each other. From the bottom of the heat exchanger 210 the gas 202 is conveyed to a cooler or dehumidifier 214 which it enters at the bottom, then passes a valve 216 and leaves at the top of the cooler 214. Between the first moistener or wetting device 204 and the lower part of the cooler 214 a circulation of a cooling agent such as water and/or steam is maintained through the connections 218 and 220 establishing a circulation of the cooling agent. Furthermore, cooling water preferably fresh water enters the cooler 214 at the top through the connection 222 and is withdrawn from the same by a connection 224 starting above the wall 226 provided with the valve 216.

The system C is a partially converting device operating preferably at atmospheric pressure. The flow of gas is indicated by reference number 300. The gas at a rate, for instance, of 100,000 cubic meters per hour is conveyed by a fan 302, passes then a moistener or wetting device 304 and enters the same at the bottom thereof, leaving the moistener 304 at the top. From here the gas is conveyed through a contact device generally denoted by 306 and including the heat exchanger 308 and a contact furnace 310. After leaving the contact device 306 the gas enters a cooler 312 from below and leaves the same at the top. The cooler 312 is traversed by a cooling agent such as fresh water entering through the connection 314 arranged at the top of the cooler 312. The cooling water leaves the cooler 312 through a connection 316 at the bottom thereof.

By way of definition, a high pressure converting system is one in which the prevailing operating pressure lies within the range of about 10 to about 50 atmospheres, while a reduced pressure converting system is one in which the prevailing operating pressure lies within the range of about 1.2 to about 10 atmospheres, all of this being well known to the prior art. It is to be noted, however, that the boundaries of these ranges may be somewhat higher than those stated above. Of course, a low pressure (partially converting) system is one in which the prevailing operating pressure stays approximately at atmospheric or, at all events, below the lower limit of the reduced pressure range. The associated operating temperatures of the gas and circulating water in any particular converting system depend on the operating pressure maintained in such system and also on the temperature of any live steam introduced into the system during the conversion process.

The circulation of water and of steam through the converting systems A, B, and C, shall now be described more fully in detail. The hot water issuing from the cooler 112 enters the saturator 102 of the high pressure converting device A through a conduit 404 shown in dotted lines. In the saturator 102 the compressed gas in brought to intimate contact with the hot water entering through conduit 404 so as to be saturated with steam under the prevalent conditions of pressure and temperature, the water leaving the saturator 102 at a temperature reduced by 40°–60° C. and at a high pressure, through a conduit 406. This pressure is reduced by an expansion device 408 and the steam generated in the expansion device 408 is drawn off through a conduit 410 shown in dash-dotted lines and opening at 412 into the gas conduit 202 of the system B.

The conduit 120 forking into the conduits 116 and 118 is fed with steam from a high pressure system (not shown).

From the expansion device 408 the hot water is conveyed into the moistener 206 of the converting device B operating at a lower or reduced pressure; the hot water enters the moistener 206 from above, comes into intimate contact with the gas flowing therethrough from bottom to the top and leaves the moistener 206 as a temperature of 75 to 80° C. Then the water passes through a pump 414 and enters the moistener 304 of the partially converting device C in which it comes into intimate contact with the flow 300 of gas. After passing through the moistener 304 the water has a temperature of approximately 40–45° C. and passes then a high pressure pump 416 by which it is conveyed through the connection 418 to the top of the cooling device 112 of the high pressure converting device A in which the gas flowing through the cooling device 112 has a relatively high temperature of more than 220° C. so that the water leaves the cooler 112 at an elevated temperature of approximately 180°–200° C., this temperature depending on the pressure in the high pressure system A. The water passes then a pressure pump 420 which conveys the same as hot water through the conduit 404 communicating with the top of the saturator 102. The operation of this device is as follows:

Three separate quantities of crude gas, for instance gas mixtures containing carbon monoxide, are admitted through the systems A, B, and C, respectively and conveyed through the moisteners, the contact devices, and the cooling devices thereof. At the same time water is conveyed in a closed circuit through the conduit 404, the saturator 102 of the high pressure converting device A, the expansion device 408, the moistener 206 of the converting device B, the pump 414, the moistener 304 of the partially converting device C, the high pressure pump 416, the conduit 418, the cooler 112 of the high pressure converting device A, and the pressure pump 420, back to the saturator 102 of the high pressure converting device A. The water undergoes thereby the changes of temperature and pressure indicated above.

Furthermore, a portion of the hot water discharged from the saturator 102 of the first system A is converted into steam by the expansion device 408 and said steam is conveyed through the steam conduit 410 into the gas conduit 202 of the second system B. Said steam entering the gas conduit 202 of the system B covers the additional amount of steam required by said system B operating at a pressure lower than the pressure of the first system A.

Moreover, the hot water delivered by the pump 414 from the moistener 206 of the second system B into the moistener 304 of the third system C produces sufficient steam to cover the additional amount of steam required by the third system C operating without pressure.

Thus, the hot water discharged from the saturator 102 of the first system A is utilized to cover the additional amounts of steam required by the second and third systems B and C.

In the high pressure fully converting device A and the reduced pressure fully converting device B the content of carbon monoxide of the entering crude gas is converted approximately entirely into hydrogen according to the equation $$CO + H_2O = H_2 + CO_2$$

with the exception of a residual content of carbon monoxide amounting to 3–4% CO; however, the carbon monoxide is converted in the partially converting system C only so far as it is required for a subsequent synthesis, for instance a methanol synthesis.

Since in practice, particularly in larger industrial plants, a conversion of carbon monoxide is required for a plurality of syntheses, for instance a synthesis of ammonia, a synthesis of an alcohol, a hydrogenation under pressure for the production of gasoline, or a Fischer-Tropsch process, which are to be carried out one after the other, the new process described hereinabove may be applied with advantage particularly in such industrial plants.

The hot water escaping from the saturator of carbon monoxide converting systems may be used also for saturating with steam, other gases such as hydrocarbons, fan blasts, oxygen etc., and generally all gases which have to be wetted. This is accomplished by guiding the circulating hot water from the discharge of the saturator of the converting system in a closed circuit to the moistener of the gas in question, then to the cooler of the converting system so that it is brought to the temperature required for the saturation of the crude gas, and then is conveyed to the inlet of the saturator of the system in which the gas is to be moistened.

An embodiment operating according to this principle is shown diagrammatically in Fig. 2 of the drawings. The hot water escaping from the saturator 500 of the converting system $A_1$ is conveyed though a conduit 502 to a moistener 504 in which the gas flowing along a path 506 is mixed entirely or partly with the steam and water required for the reaction. This reaction is carried out in an apparatus generally denoted with 508 such as a cracking device for gases or a generator. From the moistener 504 the water is conveyed by a pump 510 to the cooler 512 of the converting system $A_1$ and is there heated by heat exchange with the hot converted contact gases. From the cooler 512 the water is conveyed by means of a pump 514 to a conduit 516 communicating with the top part of the saturator 500.

In this case the converting system $A_1$ need not necessarily be a system operating at an increased pressure. It depends on the quantity of steam required for the chemical conversion connected therewith whether the converting device $A_1$ is to be operated under pressure or not.

I wish it to be understood that in Fig. 2 I have only shown one converting stage $A_1$ and the moistener of another stage. However, this is only an example and other stages such as stages operating at lower pressure or at a normal pressure such as the stages B and C shown in Fig. 1 may be, if desired, combined with the stage $A_1$ and the additional stage shown in Fig. 2.

With respect to the make-up of the converting plant it is to be noted that the various humidifiers (sometimes referred to as saturators, moisteners or wetting devices), oxidizers (sometimes referred to as contact devices), and dehumidifiers (sometimes referred to as coolers or moisture condensing means) are conventional elements of structure normally employed in such plants as known to the art, and more specific description and illustration of these elements is thus not deemed necessary.

*Example*

The consumption per hour of steam of two fully converting systems having a crude gas rate of flow of totally 178,000 cubic meters per hour and a partial converting system having a crude gas rate of flow of 100,000 cubic meters per hour amounts only to 50 to 60 tons of steam. If, however, the converting devices are separately operated the consumption of steam amounts to 110 to 130 tons per hour. Thus it is seen that the saving of steam obtainable by the invention is very considerable. The steam consumption is reduced by the process according to the invention to a magnitude corresponding to the theoretical value required for the converting reaction.

Furthermore, an important saving of cooling water is obtained since the hot water during the circulation thereof is conveyed at a temperature of only about 40° C. into the cooler 112 of the system A. Also the converted gas leaving the system A escapes from the cooler 112 thereof at a temperature of 40 to 50° C. which is relatively low so that the same does not need practically any cooling during the subsequent treatment thereof, so that the final cooler needed with other processes may be dispensed with.

I have described hereinabove preferred embodiments of the process and plant according to my invention for converting carbon monoxide. However, I wish it to be understood that various modifications, substitutions of equivalents, and changes may be made without departing from my invention.

What I claim is:

1. In the process of simultaneously converting carbon monoxide into a mixture of carbon dioxide and hydrogen and wetting another gas; the steps of saturating carbon monoxide with hot water in a humidifying stage of a converting system, partly transforming the water discharged at a reduced temperature from said humidifying stage into steam, feeding said last-named water and steam into a humidifying stage of a gas-wetting system for wetting said gas, feeding the water discharged at a still more reduced temperature from said humidifying stage of said gas-wetting system into a dehumidifying stage of said converting system for contact therein with the formed carbon dioxide-hydrogen mixture to condense and remove moisture therefrom in the form of water, and returning the resultant hot water from said dehumidifying stage to said humidifying stage of said converting system for reuse in saturating additional carbon monoxide.

2. In the process of converting carbon monoxide into a mixture of carbon dioxide and hydrogen; the steps of saturating in a humidifying stage of a high superatmospheric pressure converting system a first predetermined quantity per unit time of carbon monoxide with hot water, partly transforming water discharged at a reduced temperature from said humidifying stage into steam, feeding the untransformed remainder of said last-named water into a further humidifying stage of a reduced superatmospheric pressure converting system for saturating a second predetermined quantity per unit time of carbon monoxide with hot water so as to obtain a mixture of said second quantity of carbon monoxide and water, adding said steam to said carbon monoxide-water mixture, pumping water discharged at a still more reduced temperature from said further humidifying stage of said reduced pressure converting system into another humidifying stage of a partially converting system operating at approximately atmospheric pressure for saturating a third quantity per unit time of carbon monoxide with water, pumping the water discharged at a relatively low temperature from said other humidifying stage of said partially converting system into a dehumidifying stage of said high pressure converting system for contact therein with the respective formed carbon dioxide-hydrogen mixture to condense and remove moisture from the same, and returning the resultant hot water discharged from said dehumidifying stage to said humidifying stage of said high pressure converting system for reuse therein as the hot water for saturating said first quantity of carbon monoxide.

3. In the process of claim 2; the further steps of presaturating said second quantity of carbon monoxide with hot water in a preliminary humidifying stage of said reduced pressure converting system prior to entrance of said second quantity of carbon monoxide into said further humidifying stage of said reduced pressure converting system, feeding water discharged at a relatively lower temperature from said preliminary humidifying stage into a dehumidifying stage of said reduced pressure converting system for contact therein with the respective formed carbon dioxide-hydrogen mixture to cool the same and remove moisture therefrom, and returning the resultant hot water discharged from said last-named dehumidifying stage to said preliminary humidifying stage of said reduced pressure converting system for reuse therein as the hot water for presaturating said second quantity of carbon monoxide.

References Cited in the file of this patent

UNITED STATES PATENTS

| | | |
|---|---|---|
| 1,157,669 | Bosch et al. | Oct. 26, 1915 |
| 1,904,908 | Voorhees | Apr. 18, 1933 |
| 1,935,675 | Spalding | Nov. 21, 1933 |
| 1,988,759 | Svanoe | Jan. 22, 1935 |
| 2,660,521 | Teichmann | Nov. 24, 1953 |
| 2,809,099 | Baumann | Oct. 8, 1957 |

FOREIGN PATENTS

| | | |
|---|---|---|
| 27,042 | Netherlands | July 15, 1932 |